Dec. 9, 1947.  R. C. DEHMEL  2,432,141
ELECTROMECHANICAL INTEGRATING DEVICE WITH INVERSE FEEDBACK
Filed Sept. 21, 1944
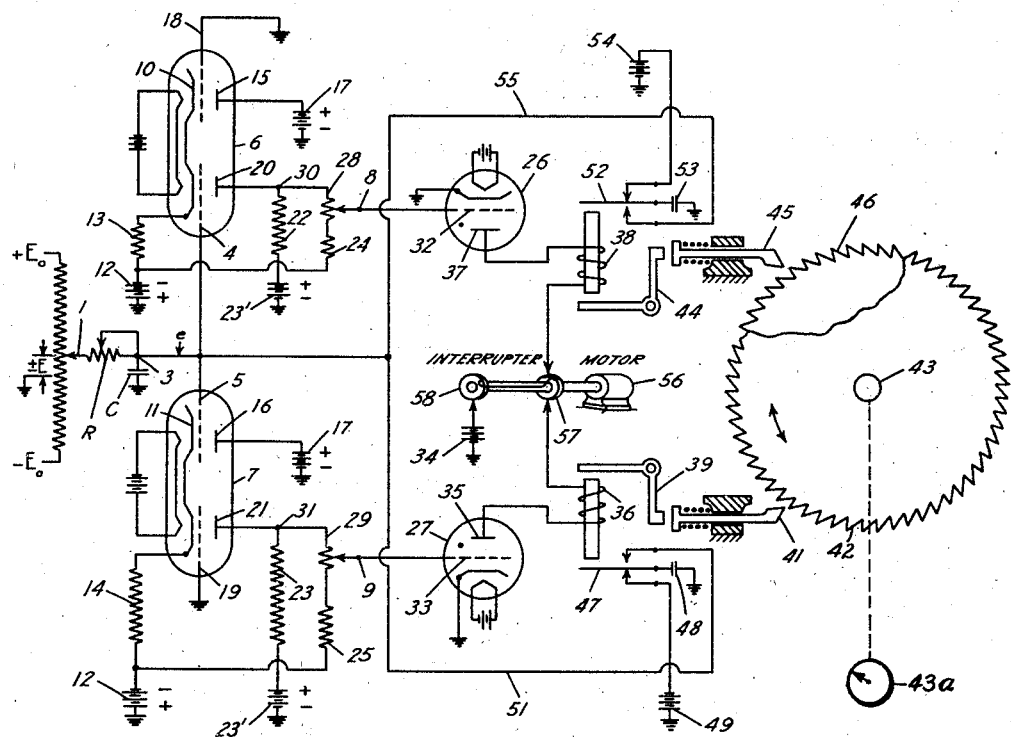
INVENTOR
Richard C. Dehmel
BY
Ward, Crosby & Neal
attorneys Patented Dec. 9, 1947

2,432,141

UNITED STATES PATENT OFFICE 2,432,141

ELECTROMECHANICAL INTEGRATING DEVICE WITH INVERSE FEEDBACK

Richard C. Dehmel, Summit, N. J.

Application September 21, 1944, Serial No. 555,112

9 Claims. (Cl. 172—240)

This invention relates to electrical devices responsive to a variable input voltage and particularly to the control and operation of movable members by and in accordance with a variable electrical potential such, for example, as is the case in various electrical computing machines, registering devices and the like. The invention is an improvement upon the mechanism shown in my copending application, Serial No. 544,714, filed July 13, 1944.

An object of this invention is to provide an improved mechanism constructed and arranged to move a registering or computing member at a velocity proportional to the instant value of a voltage which may vary not only in magnitude but in a positive and negative sense.

A further object is to provide a mechanism of this type capable of a very high degree of accuracy in operation.

These and other objects which will be apparent are accomplished by the invention hereinafter described and illustrated in the accompanying drawing in which is shown a diagrammatic view illustrating a preferred circuit arrangement comprising one embodiment of the present invention.

As in my copending case, the herein illustrated embodiment of the invention comprises a registering element which is actuated by a rotatable shaft, movable in one direction in response to a positive input potential and in the other direction in response to a negative potential, the velocity or rate of movement of the shaft in either direction being directly proportional to the input voltage. A pair of thermionic tubes are so arranged as to amplify the input voltage and transmit it to the control grids of a pair of gas-discharge tubes such as a pair of thyratron tubes which are connected to the respective thermionic tubes in such a way that one gas-discharge tube is actuated by a positive input voltage, while the other is actuated by a negative voltage. The discharge of one tube is employed to operate a mechanical stepping device for moving the indicating member, such as the rotatable shaft referred to, in one direction, while the discharge of the other tube operates a stepping mechanism for rotating the shaft in the other direction. The rate of rotation imparted to the shaft is proportional to the input voltage and the direction of rotation is determined by whether the potential is positive or negative. In my copending application, the discharge of each tube is also employed to remove the voltage imposed on a condenser, and for this purpose the condenser circuit is grounded upon the firing of each thyratron tube.

In the present system, the charge impressed on the condenser by the input voltage is neutralized by metering off only a determinate amount of coulombs for each firing of the thyratron tubes, with the result that the integrator is capable of accuracies approaching an extremely small fraction of a per cent over an unusually wide range of operating speeds, and is accordingly a very important improvement over other heretofore available means of integrating electrical potentials or currents with respect to time.

As illustrated, a control voltage $\pm E$ is impressed on the circuit through a conductor 1 connected to a tank condenser C through an impedance such as a resistance R, the values of the condenser and the resistance being so chosen that the condenser is charged at a predetermined desired rate to produce a certain potential $e$ at the junction 3 where the condenser C and conductor 1 are connected.

The junction 3 is connected to the grids 4 and 5, respectively, of two thermionic tubes 6 and 7 to amplify the input voltage changes and transmit such amplified changes to junctions 8 and 9, respectively. Consequently, the voltage changes at the junctions 8 and 9 are amplifications of the voltage variations across the condenser C, and the connections to the thermionic tubes 6 and 7 are such that the potential at the junction 8 is opposite to the potential at the junction 9. For this purpose, as well as to provide circuit stability, the thermionic valves 6 and 7 are preferably twin triode tubes having cathodes 10 and 11, respectively, each formed by a single cathode element or, as illustrated, by interconnected separate elements. The cathode of each tube is preferably connected to a low impedance source 12 of constant negative potential through high ohmic resistances 13 and 14, respectively. The anodes 15 and 16 of the thermionic valves are energized by a preferably low impedance source 17 of constant positive potential. The respective grids 18 and 19 are grounded, while the remaining anodes 20 and 21, respectively, are energized through plate impedances 22 and 23, respectively, by a preferably low impedance source 23' of constant positive potential. Additional impedances 24 and 25, respectively, which are energized by the constant negative potential source 12 are provided for the purpose of bringing the mean potential of the junctions 8 and 9 to approximately ground potential for a purpose hereinafter described. Obviously, the tubes have conventional filaments connected to any suitable source of potential.

The amplified voltage variations of the junctions 8 and 9 are employed for operating a movable indicating member such, for example, as a rotatable shaft through separate mechanisms which are separately actuated when a positive potential is established at either junction. For this purpose, a pair of thyratron tubes 26 and 27 are associated with the junctions 8 and 9, respectively. The mean potential of the junctions 8 and 9 is controlled through a vernier control provided by potentiometers 28 and 29 and it will be apparent, as hereinafter described, that the circuit connections vary the potentials of the junctions 8 and 9 in an amount proportional to changes in the potential $e$ at junction 3, in the following manner.

A potential $e$ on grid 4 of thermionic tube 6 varies the space current to the anode 20 in the well known manner. If the potential $e$ increases positively, the anode current to the plate 20 rises. This causes an increased voltage drop across the impedance 22 which may be a resistance. Accordingly, the potential at the junction 30 connecting the impedance to the plate becomes negative with respect to its mean value. On the other hand, the accompanying positive increase in the potential on the grid 5 of the thermionic tube 7 produces a rise of the potential at the junction 9 in the following manner. A positive increase in the potential on the grid 5 increases the space current from the source 12 through the cathode resistor 14 and from the cathode 11 to the anode 16, this current flow being aided by the source 17 of potential. The resulting increased cathode current produces an increase in the voltage drop across the cathode resistor 14 and, hence, increases the potential of the cathode 11 with respect to ground and therefore with respect to the grid 19. This is the equivalent of the grid 19 becoming more negative with respect to the cathode 11 and thus reducing the space current to the anode 21 which in turn flows through the impedance 23, which also may be a resistance similar to the resistance 22. This decreased current results in a lower voltage drop across the impedance 23 and, hence, a rise in potential at the junction 31 between the impedance and the anode 21. Consequently, the junction 9 rises above its mean value of potential.

The junctions 8 and 9 are respectively connected to the grids 32 and 33 of the thyratron or other gas-discharge valves 26 and 27. A current source 34 is connected to the anode 35 of the tube 27 through a relay winding 36 and to the anode 37 of the tube 26 through a relay winding 38. The winding 36 is adapted to actuate a bell crank lever 39 having one arm in position to operate a spring pressed pawl 41 cooperating with a ratchet 42 for rotating the shaft 43 in one direction. Similarly, the winding 38 actuates a bell crank lever 44 having an arm arranged to operate a spring pressed pawl 45 to rotate a ratchet 46 for rotating the shaft 43 in the opposite direction. The instant position of the shaft 43 with reference to a mean position may be indicated in any suitable manner such as by a position indicator or meter 43a connected directly to the shaft.

A movable armature 47 normally connects a neutralizing condenser 48 with a source 49 of constant negative potential and is movable to connect the neutralizing condenser 48 to the tank condenser C over a lead 51 whenever the relay coil 36 is energized. Similarly, a movable armature 52 normally connects a neutralizing condenser 53 with a constant source 54 of positive potential and is movable to connect the neutralizing condenser 53 and the tank condenser C over a lead 55 when the relay coil 35 is energized. The tank condenser C is preferably of large capacity with respect to the neutralizing condensers 48 and 53.

Any type of current interrupter for releasing the relays can be provided. For example, that shown includes a motor 56 rotating an interrupter disc 57 having a periphery half conductor and half non-conductor engaged at opposite points by suitable brushes or the like connected to the respective relay coils. The current source 34 is connected through a conducting disc 58 to the conducting portion of the interrupter disc 57. It will be apparent that such an arrangement provides an interlock for the relay coils 36 and 38 preventing the simultaneous operation thereof. Any other type of current interrupting device such, for example, as a reed vibrator or vacuum tube circuit can be employed. Of course, if the current from the source 34 is alternating current of a frequency not more than the operating speed of the relays, no interrupter need be employed.

As is well known, a grid-controlled gas-discharge rectifier passes no anode current until the potential of the grid has been increased in a positive direction above a critical negative value. Accordingly, if the grids 32 and 33 of the thyratron or similar valves are maintained at a mean negative value by adjustment of the respective potentiometers 28 and 29, the thyratron valves 26 and 27 will not discharge until the potential $e$ at the junction 3 has driven the potential at either of the junctions 8 or 9 above the said critical potential of the grids 32 or 33. If the potential E is positive, the potential $e$ at the junction 3 will be positive and, therefore, the junction 9 and the grid 33 of the tube 27 will be driven to a positive potential in the manner above described, and the tube 27 will operate causing current from the source 34 to discharge unidirectionally through the relay winding 36 causing the bell crank 39 to actuate the spring pressed pawl 41 and rotate the ratchet 42 and shaft 43 in a counterclockwise direction. The pawl spring returns the pawl and bell crank to their original positions. Energizing of the relay winding 36 also moves the armature 47 to connect the negatively charged neutralizing condenser 48 to the tank condenser C over the lead 51 and thereby cancelling or metering off from the latter a determinate amount of charge for each operation of the ratchet. This transfer of predetermined charge increments from the condenser 48 to condenser C reduces the potential of condenser C by metered increments.

A negative potential at E, on the other hand, drives the grid 32 of the valve 26 to a positive value permitting current from the source 34 to flow through the relay winding 38 to actuate the bell crank 44 and operate the spring pressed pawl 45 to rotate the associated ratchet 46 and shaft 43 in a clockwise direction. The winding 38 also moves armature 52 to connect the neutralizing condenser 53 to the tank condenser C over the lead 55, thereby metering off or cancelling a determinate amount of negative charge for each operation of the ratchet by the relay 38. Each such operation of relay armature 52 causes a definite increment increase in potential of condenser C. From the foregoing, it will now be apparent that the action of the apparatus of Figure 1 is such that the respective of the relays energized by windings 36 or 38 will operate to continually neutralize any charge on the tank condenser C and thereby maintain this condenser at substantially zero potential.

It will now be clear that since the relays having windings 36 and 38 will operate as required to neutralize any charge on condenser C, the rate of charging tank condenser C through resistance R will determine the frequency of operation of said relays and hence the speed and direction of rotation of shaft 43.

Inasmuch as the time required for the condenser C to receive sufficient charge to reach a voltage which will cause grids 32 or 33 to deviate sufficiently from their mean potential to operate the respective valves 26 and 27 is directly and substantially linearly proportional to the input voltage E, the shaft 43, or other movable member, will rotate in a direction and at a speed directly proportional to the value of the input voltage.

The coulombs charge Q, flowing through resistance R to the continually neutralized condenser C for any interval from time $t_1$ to time $t_2$ is $$Q = \frac{1}{R} \int_{t_1}^{t_2} Ef(t) \, dt$$

Since, as described above, the operation of the bell cranks 39 and 44 is proportional to the coulomb flow Q, the displacement $\alpha$ of shaft 43 during the same time interval, $t_1$ to $t_2$, is $$\alpha = k \int_{t_1}^{t_2} Ef(t) \, dt$$

where $k$ is a proportionality factor.

Hence, the displacement of member 43 is the time integral of the voltage E applied to lead 1. Also, it should be noted that the rate of voltage increase on the condenser C is dependent on the value of the resistance R. By making this an adjustable resistance, as illustrated, the proportionality factor between the rate of rotation of the shaft 43 and the input voltage E may be varied at will. Furthermore, an additional control of the proportionality factor is obtained by the adjustable potentiometers 28 and 29 which determine the mean potential of the connected grids 32 and 33 and thereby determine the rise of potential at junction 3 which is necessary to drive the grids to their operating potential. A further proportionality or speed control is obtained by varying the potential of the sources 49 and 54.

It will be obvious, of course, that if the potential E, applied to lead 1 never reverses in polarity, one of the stepping relays and its associated thyratron and amplifier may be omitted.

Although I have described and shown in specific detail one embodiment of this invention, it will be apparent that the invention can be variously modified and adapted within the scope of the appended claims.

I claim:

1. The combination with an electrical circuit on which is impressed a varying potential and which includes a tank condenser arranged to be charged thereby at a rate according to a predetermined time constant, of a movable member, and means for controlling said member whereby its position at any given instant is a result of the time integral of the varying potentials, including separate thermionic valve means, an amplifier circuit arranged to operate one of said valve means in response to a negative potential on said condenser and to operate the other of said valve means in response to a positive potential on said condenser and means controlled in accordance with the operation of said valve means for neutralizing a determinate portion of the charge on said condenser.

2. The combination in a device responsive to a variable input voltage, of a tank condenser, a movable member, means for moving said member whereby its position at any given instant is proportional to the time integral of the varying potential, including separate means actuated by the input voltage for moving said member in opposite directions, an amplifier circuit responsive to a negative potential on said tank condenser for actuating one of said means to move said member in one direction and responsive to a positive potential on said tank condenser for actuating the other of said means to move said member in the opposite direction, and mechanism including a neutralizing condenser for neutralizing the charge on said tank condenser in timed relation to the actuation of said separate means.

3. The combination in a device responsive to a variable input voltage, of a tank condenser, a movable member, means for moving said member whereby its position at any given instant is proportional to the time integral of the varying potential, including separate means actuated by the input voltage for moving said member in opposite directions, an amplifier circuit responsive to a negative potential on said tank condenser for actuating one of said means to move said member in one direction and responsive to a positive potential on said tank condenser for actuating the other of said means to move said member in the opposite direction, and mechanism including a negatively charged neutralizing condenser and means actuated by operation of one tube for connecting said tank condenser to said negatively charged neutralizing condenser to neutralize a determinate voltage on said tank condenser, a positively charged neutralizing condenser and means actuated by operation of said second thermionic valve circuit for connecting said tank condenser to said positively charged neutralizing condenser to neutralize a determinate voltage on said tank condenser.

4. The combination with an electrical circuit on which is impressed a varying potential and including a condenser arranged to be charged thereby at a rate according to a predetermined time constant, of a movable member, means for controlling said member whereby its position at any given instant is a result of the time integral of the varying potential, including separate thermionic valve means, an amplifier circuit arranged to operate one of said valve means in response to a negative input potential and to operate the other of said valve means in response to a positive input potential, a relay having a coil electrically connected to a circuit having a current source and controlled by the first valve means, mechanism operated by said relay for moving said member in one direction, a second relay having a coil electrically connected to a circuit having a current source and controlled by the other valve means, mechanism operated by said second relay for moving said member in the opposite direction, and means responsive to operation of either relay to neutralize a determinate portion of the voltage on said condenser.

5. The combination with an electric circuit on which is impressed a varying potential and which includes a tank condenser arranged to be charged at a rate according to a predetermined time constant, of a movable member, and means for controlling said member whereby its change in position during any given time interval is proportional to the time integral of the varying potential, including stepping mechanism controlled by thermionic valve means, said valve means being responsive to the charge on said condenser, and means responsive to said thermionic valve means for neutralizing a determinate portion of the charge on said condenser in accordance with the operation of said stepping mechanism.

6. An electrical circuit according to claim 5 in which the neutralizing means comprises a second condenser alternately charged with a potential opposite in polarity to said varying potential and discharged into said tank condenser, said alternation being in accordance with the operation of said stepping mechanism.

7. An electro-mechanical device for actuating a movable member at rates corresponding to an input potential varying in magnitude and polarity and for displacing said member in accordance with the time integral of said varying potential, comprising a condenser, means for charging said condenser by said potential at a predetermined rate, said rate varying directly with the instant magnitude and polarity of said potential, solenoid operated means responsive to the charge on said condenser for displacing said member in predetermined increments and in a direction corresponding to the polarity of the instant charge on said condenser, and means for modifying the charge on said condenser by a predetermined amount with each said increment displacement, the polarity of such modifying charge being in accordance with the direction of said displacement and tending to reduce the charge on said condenser.

8. An integrating device in accordance with claim 7 in which the means for modifying the charge on the condenser comprises capacitor means with circuit switching means for independently charging said additional capacitor and thereafter discharging it into said condenser with each said increment displacement and with correct polarity as determined by the direction of said displacement.

9. The combination with an electrical circuit on which is impressed a varying potential and which includes a tank condenser arranged to be charged thereby at a rate according to a predetermined time constant, of a movable member, and means for controlling said member whereby its position at any given instant is a result of the time integral of the varying potentials, including separate thermionic valve means, an amplifier circuit arranged to operate one of said valve means in response to a negative potential on said condenser and to operate the other of said valve means in response to a positive potential on said condenser, an input circuit comprising neutralizing condenser means for supplying inverse feedback current and potential means therefor, and switching means operated by said control means for intermittently connecting said tank condenser and said neutralizing condenser means to neutralize a determinate portion of the charge on said condenser in timed relation to the operation of said valve means.

RICHARD C. DEHMEL.

REFERENCES CITED

The following references are of record in the file of this patent:

UNITED STATES PATENTS

| Number | Name | Date |
| --- | --- | --- |
| 2,368,582 | Sziklai | Jan. 30, 1945 |